United States Patent [19]

Iguchi et al.

[11] Patent Number: 5,466,916
[45] Date of Patent: Nov. 14, 1995

[54] METHOD AND APPARATUS FOR JOINT RESIN PIPES USING HIGH-FREQUENCY ELECTRIC INDUCTION HEATING

[75] Inventors: Atsushi Iguchi; Atsushi Akabane; Takehiro Yamashita, all of Kyoto; Koichi Matsuoka, Nobeoka, all of Japan

[73] Assignees: Hidec Co., Ltd., Kyoto; Asahi Yukizai Kogyo Co. Ltd., Nobeoka, both of Japan

[21] Appl. No.: 279,797

[22] Filed: Jul. 25, 1994

[30] Foreign Application Priority Data

Sep. 24, 1993 [JP] Japan ................... 5-237564
May 23, 1994 [JP] Japan ................... 6-108066

[51] Int. Cl.⁶ .................................................. H05B 6/10
[52] U.S. Cl. ....................... 219/633; 219/634; 219/643; 288/21; 156/274.2
[58] Field of Search ................................. 219/633, 634, 219/611, 643; 285/21; 156/272.4, 274.2; 264/26, 27, 25

[56] References Cited

U.S. PATENT DOCUMENTS

| | | | |
|---|---|---|---|
| 2,739,829 | 3/1956 | Pedlow et al. | 219/633 |
| 2,930,634 | 3/1960 | Merritt | 219/633 |
| 2,943,179 | 6/1960 | Raiha . | |
| 3,062,940 | 11/1962 | Bauer et al. | 219/633 |
| 3,238,346 | 3/1966 | Sauko | 219/633 |
| 3,996,402 | 12/1976 | Sindt | 219/634 |
| 5,053,595 | 10/1991 | Derbyshire | 219/633 |
| 5,160,396 | 11/1992 | Jensen . | |
| 5,338,920 | 8/1994 | Okusaka et al. | 219/633 |

FOREIGN PATENT DOCUMENTS

| | | |
|---|---|---|
| 0107096 | 5/1984 | European Pat. Off. . |
| 1299796 | 12/1962 | France . |
| 2036780 | 12/1970 | France . |
| 2350154 | 12/1977 | France . |
| 2381612 | 9/1978 | France . |
| 802282 | 2/1951 | Germany . |
| 1206572 | 12/1965 | Germany . |
| 54-10378 | 1/1979 | Japan . |
| 55-142617 | 11/1980 | Japan . |
| 5-87286 | 4/1993 | Japan . |
| 5-157190 | 6/1993 | Japan . |
| WO91/07272 | 5/1991 | WIPO . |
| WO91/09247 | 6/1991 | WIPO . |

*Primary Examiner*—Philip H. Leung
*Attorney, Agent, or Firm*—Fish & Richardson

[57] ABSTRACT

When resin pipes are connected through induction heating, the resin pipes of this invention do not form inside bulges due to air and resin expansion during the heating process. A cylindrical heater made of stainless steel is placed around the joint between two resin pipes made of polyvinylidene fluoride. The heater is then heated by induction heating to weld the joint of resin pipes. The heater has a plurality of holes on the cylindrical surface so that air and molten resin located between the heater and the resin pipes are released through the holes.

20 Claims, 10 Drawing Sheets

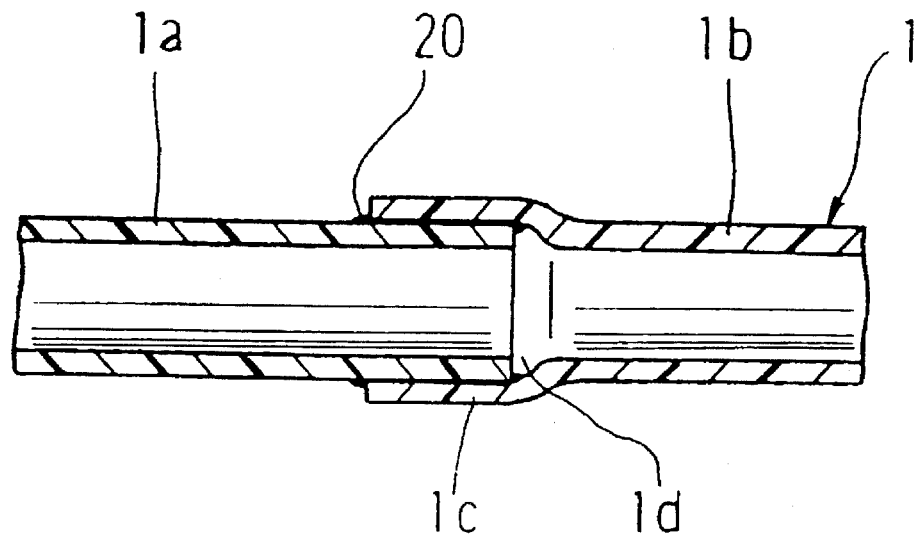
F I G. 1 2 (PRIOR ART)
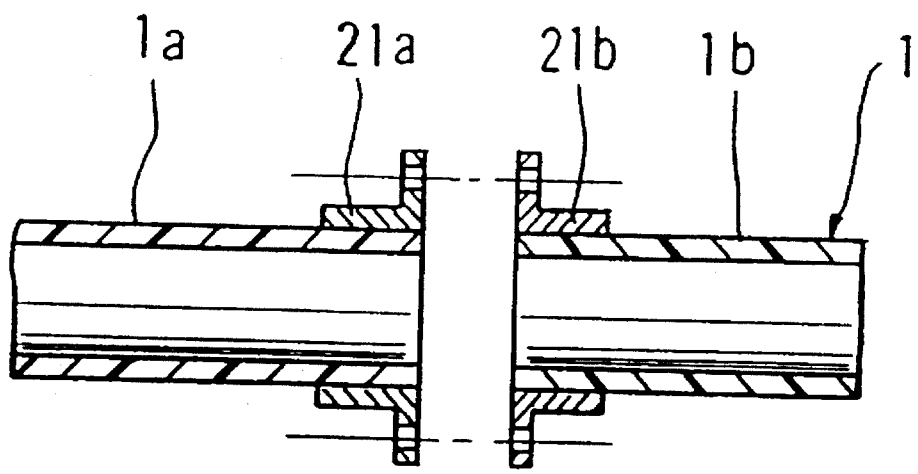
F I G. 1 3 (PRIOR ART)

METHOD AND APPARATUS FOR JOINT RESIN PIPES USING HIGH-FREQUENCY ELECTRIC INDUCTION HEATING

FIELD OF INVENTION

This invention relates to a method of and an apparatus for connecting resin pipes. More specifically, this invention relates to a method of connecting resin pipes, i.e. fluorocarbon resin pipes which are used to transfer pure water and ultrapure water for cooling superconductive coils and LSI manufacturing apparatuses, polyvinylchloride pipes which are used in agriculture and service water, and polyethylene pipes for gas. This invention also relates to an apparatus for connecting resin pipes.

BACKGROUND OF THE INVENTION

Resin pipes are commonly connected by using conventional methods such as those shown in FIGS. 12 and 13. In the method shown in FIG. 12, there are two resin pipes 1a, 1b which comprise resin pipe line 1. Resin pipe 1b is softened at end portion 1c by using a torch lamp or an electric resistance heater. End portion 1c of resin pipe 1b expands so that the inside diameter becomes slightly larger than the shape of resin pipe 1a. Then adhesive 20 is put on the inner surface of end portion 1c. The outside surface of resin pipe 1a is fit to the inside surface of resin pipe 1b. By hardening adhesive 20, the two resin pipes 1a, 1b are connected. In another method shown in FIG. 13, two flanges 21a, 21b are disposed on the peripheral ends of resin pipes 1a, 1b to be connected to form resin pipe line 1. The pipes are joined using bolts and nuts (not shown in the drawing). In another method, referring to FIG. 12, fluorocarbon resin pipes were connected by melting the outside surface of resin pipe 1a and the inside surface of resin pipe 1b, and then fitting them together.

However, the above-mentioned conventional methods have the problem of creating dead space in pipes. For example, dead space is created when the resin pipes are used to transfer pure water or ultrapure water for cooling superconductive coils and LSI manufacturing apparatuses. The method used in FIG. 12 to join the resin pipes creates dead space 1d where the two resin pipes 1a, 1b are joined. Impurities, such as water scale, accumulate in dead space 1d which is infested with bacteria. As a result, pure water or ultrapure water will also contain bacteria while in resin pipe line 1. Similarly, in the method shown in FIG. 13, it is not possible to join two resin pipes 1a, 1b completely. A small gap exists at the joint. The flanges distort a gland packing when clamped, so that the dead space created between the gland packing and the inside surface of the resin pipe has impurities such as water scale and bacteria.

In another conventional method of connecting pipes disclosed in Laid-open Japanese patent application No. (Tokkai Hei) 5-87286, two resin pipes are inserted from either side of socket-type pipe joints in which electrical resistance wires (heating wires) are embedded. Then electric current welds the pipes together. However, the usual method of manufacturing the above-mentioned socket-type pipe joints is injection molding and inserting resin-coated heating wires. This method is not only time-consuming, but also expensive due to the manufacturing pipe joints for each bore and producing a metallic mold for the injection molding.

These resin pipes are installed in ceilings or piping grooves in factories. It is not easy to work in these places. Therefore, a complicated method or apparatus can not be used to connect resin pipes.

Another method of connecting resin pipes is disclosed in Laid-open Japanese patent application No. (Tokkai Hei) 5-84829 which uses high-frequency electric power. The problem with this method is that the joints have low strength since only the end faces of resin pipes are welded together and the welded area of resin pipes is limited since the heaters are disposed at the pipe joints.

SUMMARY OF THE INVENTION

The present invention has been conceived to solve the above-mentioned problems and the purpose of the present invention is to provide a simple method for connecting resin pipes without creating dead space or a gap at the joint and to provide an apparatus which is suitable for the method.

This method of connecting resin pipes includes a configuration in which two resin pipes are placed in position to be connected and a cylindrical metallic heater is disposed along a joint (inside and outside). A coil which surrounds the heater is excited by high-frequency electric current and heats the heater by induction heating. Thus, the joint between the resin pipes is welded together.

Furthermore, this invention of connecting resin pipes includes an apparatus comprising a heater disposed around a joint between two resin pipes to be connected, a coil which surrounds the heater, and a high-frequency electric current generator for exciting high-frequency electric current into the coil to heat the heater by induction heating.

It is preferable that there are a plurality of holes in a cylindrical metal heater, disposed in the direction of the thickness of the plate. It is also possible to use a heater without holes.

It is preferable that the inside diameter of a heater has a dimensional tolerance larger than the outside diameter of resin pipes and that the heater is heated in close vicinity to the resin pipes.

Furthermore, it is preferable that at least one material of the heater is from the group consisting of stainless steel, brass or aluminum.

Furthermore, it is preferable that the heater has a cylindrical shape formed by welding ends of a stainless steel plate together.

Furthermore, it is preferable that a diameter of each of the plurality of holes disposed on the cylindrical surface ranges from 0.1 mm to 5 mm.

Furthermore, it is preferable that the plurality of holes be disposed in several rows and that the holes in each row are disposed at equal intervals.

Furthermore, it is preferable that a width of the heater ranges from about ¼ to ⅔ of a nominal diameter of resin pipes.

Furthermore, it is preferable that cylindrical stoppers comprised of a material with heat-resisting and electrical insulating properties are disposed around the resin pipes on both sides of the heater.

Furthermore, it is preferable that a material for the cylindrical stoppers is from the group consisting of phenolic resin, epoxy resin, unsaturated polyester resin, and diallyl phthalate resin.

Furthermore, it is preferable that the cylindrical stoppers made of one of phenolic resin, epoxy resin, unsaturated polyester resin, and diallyl phthalate resin, are formed as tapes and are wound around the resin pipes.

Furthermore, it is preferable to use materials for the cylindrical stoppers which are reinforced with glass fiber.

Furthermore, it is preferable that the cylindrical metallic heater is disposed around each resin pipe in a state that space exists between the two resin pipes which ranges from 0.1 mm to 10 mm.

In the above-mentioned method and apparatus to connect resin pipes, high-frequency electric current excites the coil, and magnetic flux changes according to the frequency. When magnetic flux changes, induced electromotive force is generated. Accordingly, induced electric current flows inside the heater, and the heater is heated by Joule heat. Since the heater is disposed around the joint between two resin pipes to be connected, the joint softens as it is heated gradually from the outside and then melts. Thus, the joint between the resin pipes is not heated rapidly or heated with high temperature so that there is no danger of scorching the joint or decomposed resin to start foaming. As a result, the welded joint has high mechanical strength. In this process, air between the resin pipes and the heater expands due to the heat, but the air is released through the holes in the cylindrical plate. Accordingly, even if the resin pipes are softened, bulges due to air expansion will not appear inside. There is also very little probability that water scale accumulates in the joint and that the transferred pure water is not contaminated by impurities in the resin pipes.

The present invention uses a cylindrical metallic plate for a heater. The cylindrical metallic plate may have holes disposed in the direction of thickness. When the cylindrical metallic plate with holes is used, molten resin expands and flows out from the holes on the cylindrical surface of the heater. Since it is possible to determine from the outflow of molten resin whether the outside part of resin pipes are welded together, it is necessary to continue heating until the inside part is also welded together. After that, high-frequency electric current is stopped from exciting the coil, and the heater is stopped from emitting heat. After the resin has cooled down, the heater and the joint between the resin pipes are joined together since the molten resin in the holes functions as stopper. The heater reinforces the joint between the resin pipes so that the resin pipes are strongly connected. Even if hydraulic pressure is put on the joint of the resin pipes, the heater prevents the pipes from expanding outward. Similarly, the joint will not break even if bending force is added.

It is possible to heat around the joint between two resin pipes almost uniformly by forming the inside diameter of the heater with a dimensional tolerance larger than the outside diameter of the resin pipes, and by heating the heater in close vicinity to the resin pipes. Therefore, the melting speed of the resin remains constant and welded parts of the resin form an even structure. The mechanical strength of the joint remains stable. In addition, a gap between the heater and the resin pipes is very small. Thus, not only the air between the heater and the resin pipes but also the molten resin flow through the holes. As a result, bulges caused by expansion of air and molten resin rarely appear inside the resin pipes.

According to general heating principles, when an electrical current is constant, calorific value increases according to the increase in electrical resistance. Therefore, when a material having high electrical resistance, such as stainless steel (SUS304, SUS430), is used for the heater, the calorific value is much higher than if materials with low electrical resistance, e.g. aluminium, are used. Thus, it is possible to make the cylindrical heater thinner. Furthermore, stainless steel can be molded into a cylindrical form by bending the plate and then welding the ends. More specifically, the heater of this invention has a plurality of holes on the cylindrical surface. It is easier to work and cheaper to manufacture when holes are drilled or pressed into the flat material in advance and then the material is molded into a cylinder form by welding the ends of the plate as compared to when material (pipes etc.) is molded in a cylinder first, and then holes are drilled. When a large number of holes on a heater or when mass-production of a heater is planned, it is better to use a press process for making holes on the flat material.

According to a preferable example of the above-mentioned invention that a diameter of each of the plurality of holes disposed on the cylindrical surface ranges from 0.1 mm to 5 mm, air between the heater and the resin pipes can be released as soon as the resin starts to melt. Therefore, deformation of the resin pipes can be effectively prevented. On condition that the diameter of the holes is rather small within the range, the molten resin flows out in the form of thread. On the other hand, the molten resin swells and fills the holes on condition that the diameter of the holes is rather large within the range.

Generally, it is suitable to press holes which are larger than 0.5 of the thickness of the plate into flat materials. On the other hand, a drill process can be used to make holes which are smaller than 0.5 of the thickness of the plate. Therefore, it is easier to mold by using a press process if the maximum diameter of hole is to be larger than 0.5 of the thickness of the plate. When resin pipes are connected, a molten part of resin (i.e. at the joint) is subject to pressure from self expansion of resin or artificial means. If the hole diameter is too large, this pressure can cause the resin to melt and flow out of the holes in large quantity to decrease the pressure. Then, there is also the possibility of losing too much pressure to keep the resin pipes connected. Therefore, it is preferable to keep the maximum size of the hole within twice the thickness of the plate in order to maintain pressure at molten parts.

It is preferable that a plurality of holes are disposed in several rows on a cylindrical surface of a heater and that the holes are disposed at equal intervals so that the resin passes through smoothly because resin starts to expand as soon as the melting process takes place. This configuration prevents joints between the resin pipes from deforming. In particular, expansion toward the inside of the pipe when the resin melts is prevented. In addition, the range of molten and expanded parts around the joint can be limited to a small area when the width of the heater is about ¼ to ⅔ of the nominal diameter of resin pipes. Thus, deformation of the resin pipes, more specifically, expansion toward the inside of the pipe can be prevented at the joint between the resin pipes.

Furthermore, it is preferable that a cylindrical metallic heater is disposed around each resin pipe in a state that space (slit) exists between the two resin pipes which ranges from 0.1 mm to 10 mm. A preferable example is shown in FIG. 10 in which cylindrical metallic heaters 16, 17 are disposed almost equally apart from the joint of resin pipes 1a, 1b. Space (slit) 18 which exists inbetween is determined to range from 0.1 mm to 10 mm. According to this example, the welding process is completed in the state shown in FIG. 11. In this arrangement, there will be no air in the joint so that deformation of the resin pipes can be prevented. At the same time, resin pipes 1a, 1b can be connected with even more reliability since it is possible to weld while observing how far the joint has melted.

It is not possible to attach the inside surface of the heater to the outside surface of the resin pipes completely. Therefore, molten resin which expands due to air expansion and expansion of the resin itself can be forced out from the gap located between the heater and the resin pipes. However, when cylindrical stoppers comprising materials with heat-resisting and electrical insulating properties are attached on both sides of the heater and around the resin pipes, the gap between the heater and the resin pipes is filled. Thus, the air between the heater and the resin pipes is released through the holes on the cylindrical surface of the heater. The molten resin also flows out through these holes. As a result, the molten resin will not protrude from the gap between the heater and the resin pipes. It is preferable to choose materials with heat-resisting and electrical insulating properties, such as thermosetting resins like phenolic resin, epoxy resin, unsaturated polyester resin, and diallyl phthalate resin. It is especially preferable to choose materials which are reinforced with glass fiber. Furthermore, when these materials are provided as tapes, they can be handled easier since the cylindrical stoppers are formed by winding these materials around the resin pipes.

Any kind of resin pipe which can form extrusion molding can be applied for this invention. These kinds of resin pipe include, for example, fluorocarbon resins, such as polyvinylidene fluoride, tetrafluoroethylene-hexafluoropropylene copolymer (FEP), and tetrafluoroethylene-perfluoroalkylvinylether copolymer (PFA), as well as a wide range of thermoplastic resins, such as polyvinylchloride, polyethylene, polypropylene, polyphenylene sulfide, and polyetherether ketone.

BRIEF DESCRIPTION OF THE DRAWINGS

The present invention is illustrated in the accompanying drawings.

FIG. 12 is a cross-sectional view of a conventional method for connecting resin pipes; and FIG. 13 is a cross-sectional view of another conventional method for connecting resin pipes.

DETAILED DESCRIPTION OF THE INVENTION

EXAMPLE 1

Figure 1:
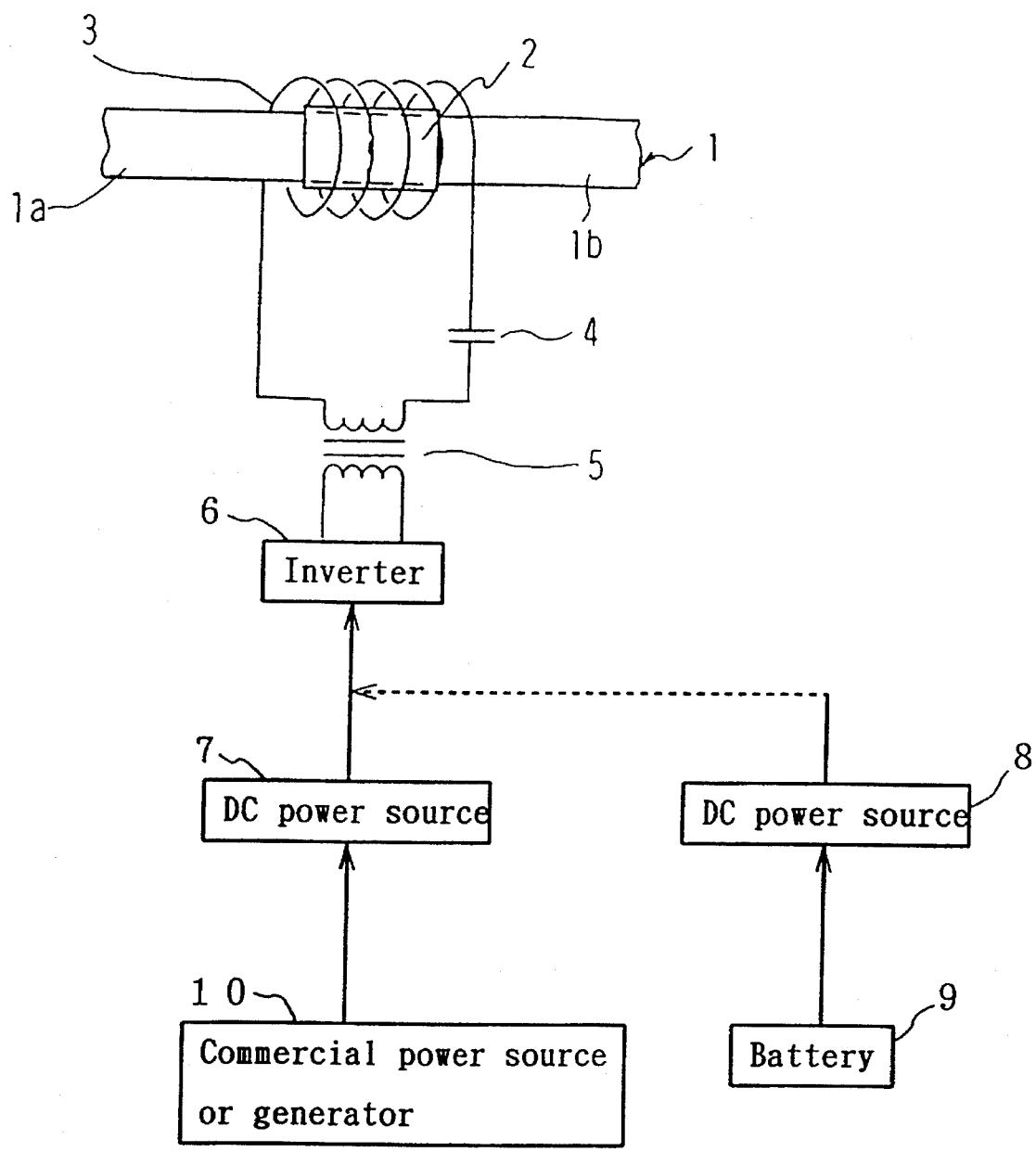
FIG. 1 is a block diagram of one embodiment of a method and an apparatus for connecting resin pipes.
Figure 2:
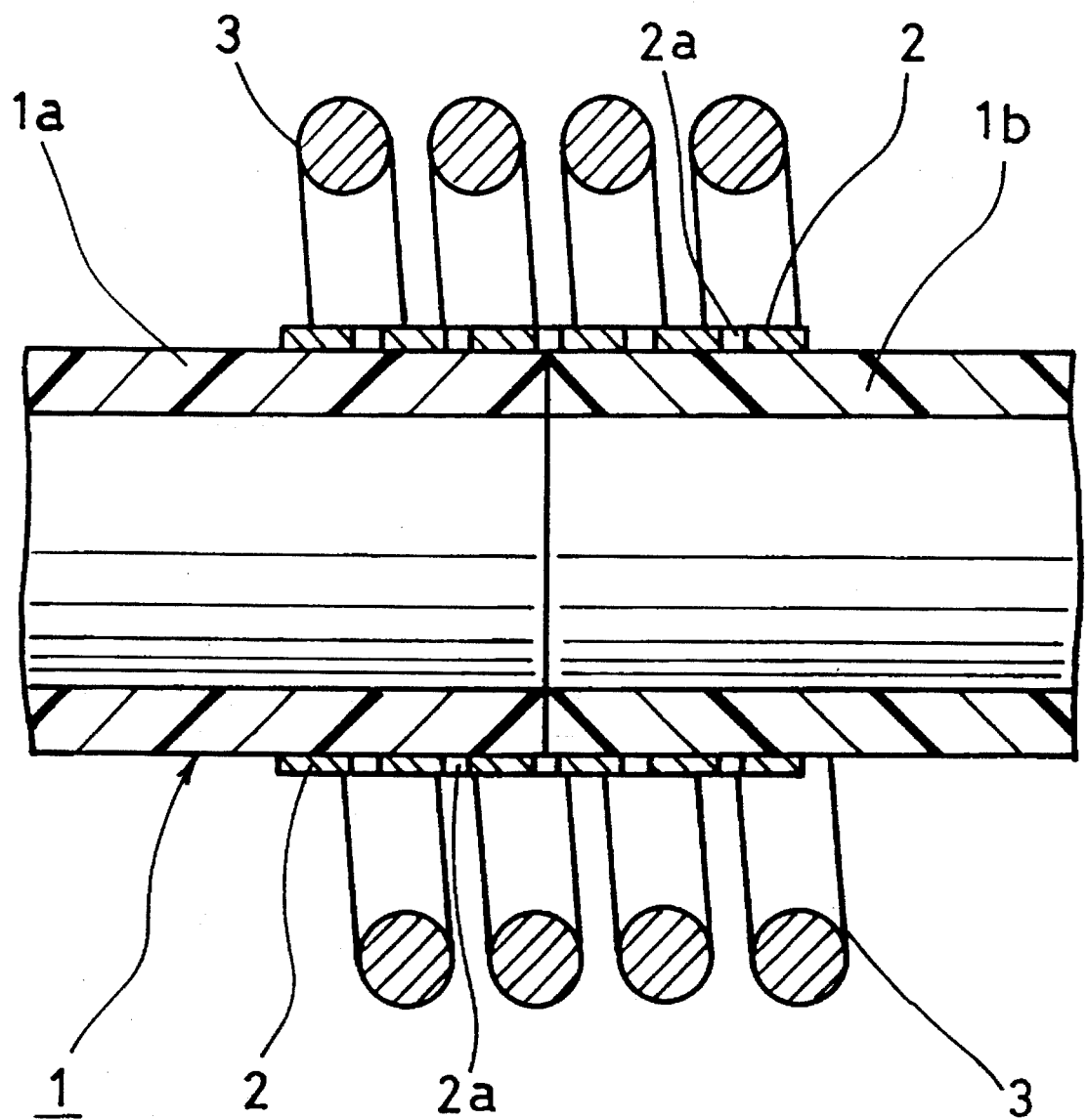
FIG. 2 is a cross-sectional view of a heater with holes, showing a joint between two resin pipes which are in position to be connected of a first embodiment.
Figure 3:
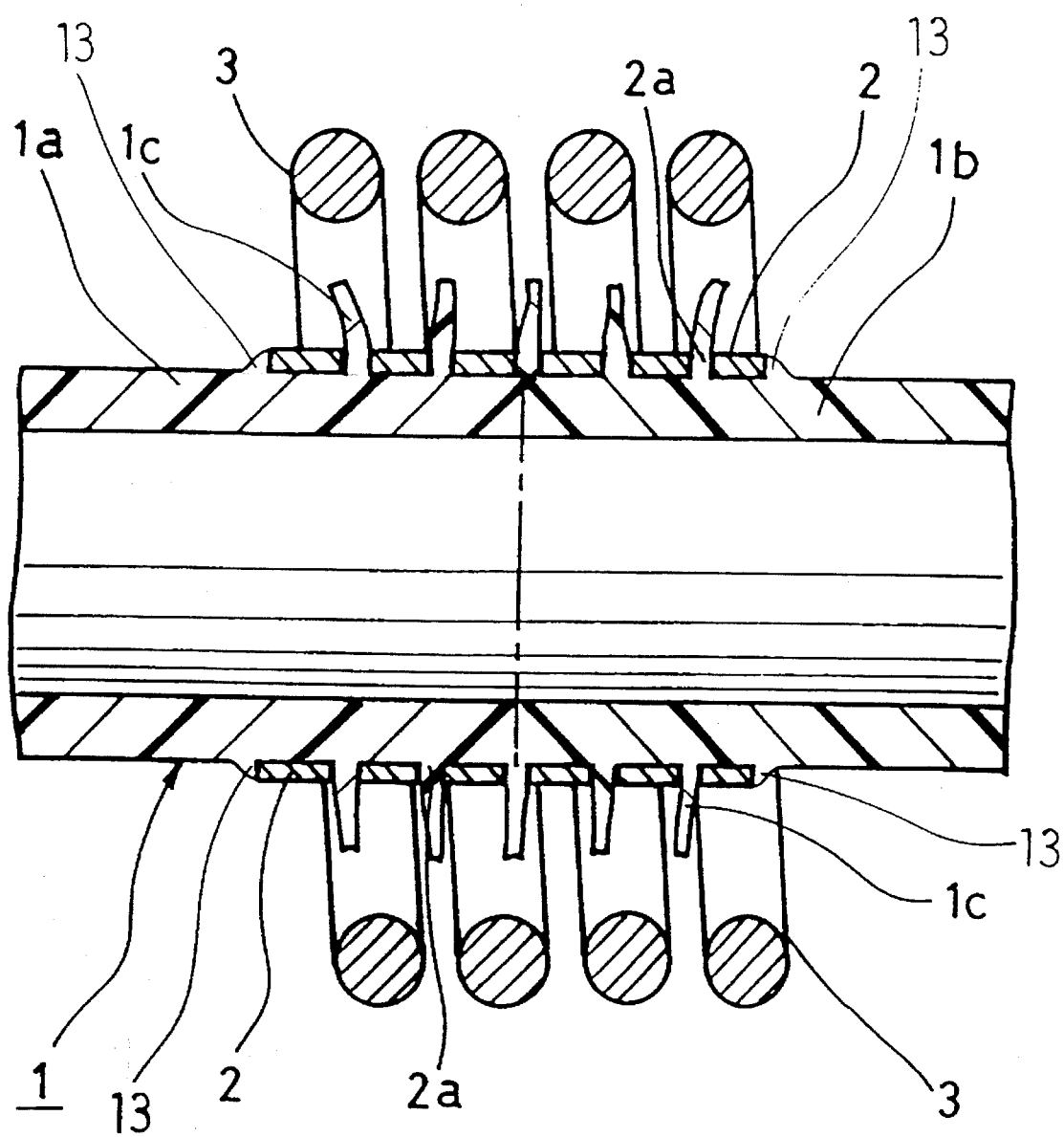
FIG. 3 is a cross-sectional view of the joint between two resin pipes immediately after being connected of a first embodiment.

One embodiment of a method and an apparatus for connecting resin pipes of the present invention is described with reference to FIGS. 1–3. FIG. 1 is a block diagram of one embodiment of a method and an apparatus for connecting resin pipes. FIG. 2 is a cross-sectional view of the joint between two resin pipes to be connected of the first embodiment. FIG. 3 is a cross-sectional view of the joint between two resin pipes immediately after being connected of the first embodiment.

In FIG. 1, two resin pipes 1a, 1b forming resin pipe line 1 are placed face to face in position to be connected. Cylindrical heater 2 made of stainless steel is placed around a joint between resin pipes 1a, 1b. Work coil 3 is wound in a loose spiral around heater 2. Resonance capacitor 4 and a secondary winding of output transformer are connected serially between both terminals of work coil 3. A primary winding of output transformer 5 is connected to inverter 6. Inverter 6 is connected to direct (DC) power source 7 and commercial power source or generator power source 10. After converting the alternating electric current into the direct electric current, DC power source 7 outputs the electric power. Also, battery 9 can provide inverter 6 with electric power. In this case, DC power source 8 converts the direct electric power from battery 9 into a predetermined voltage and/or electric current by using DC-DC converter and then outputs the electric power to inverter 6. After converting the direct electric power from DC power source 7 or DC power source 8 into alternating electric power with a predetermined voltage and frequency, inverter 6 outputs the electric power to the primary winding of output transformer 5. When alternating electric current flows with a predetermined voltage and frequency into the primary winding of output transformer 5, a predetermined secondary electric current starts to flow into the secondary winding. When the secondary electric current flows into work coil 3, magnetic flux generated from work coil 3 changes accordingly. Due to the changing magnetic flux, induced electromotive force is generated and induced electric current flows into heater 2. The induced electric current flowing into heater 2 makes heater 2 emit heat because heater 2 produces Joule heat out of resistance. It is preferable to use an inverter with integrated phase locked loop (PLL) control, since inverter 6 constantly keeps capacitor 4 and resonance circuit in resonated condition according to linkage induction of the coil.

Heater 2 is heated to several hundred degrees in order to transfer sufficient energy necessary to weld resin pipes 1a, 1b. On the other hand, although work coil 3 and heater 2 form a high-frequency transformer, work coil 3 and heater 2 are not well connected because heater 2 becomes very hot. Accordingly, linkage inductance increases such that high-frequency electric current no longer flows to work coil 3. In order to make electric current flow to work coil 3, resonance capacitor 4 forms LC series resonance circuit together with linkage inductance of work coil 3. By doing so, a high-frequency wave from LC series resonance frequency can be added so that high-frequency current flows to work coil 3. Inverter 6 detects output voltage and electric current, and controls (PLL control) the phase so that the phase differential is 0. Thus, a high-frequency wave of LC resonance frequency is generated constantly, so that the LC resonance frequency changes while heated. Furthermore, electric current flows in relationship to the change in LC resonance frequency while heated.

The resistance value of heater 2 is not very high so that a large electric current (several hundred ampere) and low voltage are generated within heater 2 in order to heat resin pipes 1a, 1b to the melting temperature. On the other hand, it is not wise to increase the number of windings too much in view of workability and costs. Therefore, output transformer is connected to obtain impedance matching. As a result, resistance against inverter 6 before reaching output transformer 5 appears to increase so that the electric power needed can be reduced. DC electric source 7 can determine and output the necessary energy for welding pipes by combining it with a timer.

As shown in FIG. 2, heater 2 has a cylindrical shape and is made of stainless steel (e.g. SUS304, SUS430). The heater has a plurality of holes 2a in the cylindrical surface. Holes 2a can be drilled into the cylindrical surface of the stainless pipe. It is also possible to mold this cylinder by making a plurality of holes 2a on the stainless steel plate using drilling or pressing processes and then bending the plate to form a cylinder and welding the ends together. The latter method is easier and cheaper in terms of manufacturing costs than molding a cylindrical material first and then drilling a plurality of holes. When a large number of holes on a heater or to mass-production of a heater is planned, it is better to use a press process for making holes on flat materials.

In the following example, heater 2 is described using particular materials and dimensions. Polyvinylidene fluoride (hereinafter abbreviated as PVDF) pipes of the same dimension as nominal diameter 75 A according to JIS. Stainless steel plate SUS304 with a thickness of 0.5 mm is the material for heater 2. Since the outside diameter of PVDF pipes with nominal diameter 75 A is 89.0 mm, heater 2 was calculated to have an inside diameter of 89.2 mm and a length of 30 mm. Holes 2a are made in five rows at 5 mm interval from the center. Each row has 28 holes disposed in a line at equal intervals. The holes 2a were a circle with a diameter of 1 mm. Although it depends on a diameter of resin pipes to be connected, it is preferable that the thickness of the stainless steel be between 0.5 and 1.0 mm for easy processing and handling.

Although it depends on the hardness of material, it is generally difficult to press holes smaller than 0.5 of thickness of the material into flat materials because the build-up shape of pressed metallic mold can be broken. Therefore, it is preferable to set the maximum diameter of holes 2a larger than about 0.5 of thickness of the material in a press process. On the other hand, when resin pipes 1a, 1b are connected, a molten part of resin (i.e., at the joint) is subject to pressure from self expansion of the resin or artificial means. However, if the diameter of hole is too large, this pressure can cause the resin to melt and flow out of holes in large quantity to decrease the pressure. Then, it is also possible to lose too much pressure to keep the resin pipes connected. Therefore, it is preferable to keep the maximum diameter of holes 2a as small as possible, for example, smaller than twice the thickness of the material in order to maintain pressure at the molten parts. Accordingly, it is preferable to choose a diameter of holes 2a (maximum dimension or maximum diameter) between 0.5 of to 2 times the thickness.

When high-frequency electric current is excited into work coil 3, the magnetic flux generated from work coil 3 changes according to the frequency, and induced electromotive force is generated in heater 2. The induced electromotive force causes electric current to flow into heater 2, and Joule heat is produced from internal resistance of heater 2. As a result, heater 2 emits heat and increases the temperature of the joint of resin pipes 1a, 1b gradually from outside. Since the inside part of heater 2 and the outside part of resin pipes 1a, 1b are almost attached, the expanded air between heater 2 and resin pipes 1a, 1b is released through holes 2a. Predetermined pressure is put on resin pipes 1a, 1b in the axial direction to connect the pipes. Therefore, when the temperature at the joint between resin pipes 1a, 1b reaches a predetermined softening or melting point, the melted and expanded resin 1c from the outside part starts to flow out through holes 2a, as shown in FIG. 3. The volume of the molten resin increases and a part of this molten resin forms build-up parts 13 on both sides of heater 2. The outside resin is heated until the inside part of the resin pipes melts, the two resin pipes 1a, 1b are welded together without a gap. Since the joint between resin pipes 1a, 1b is heated gradually, there is no danger that the joint between resin pipes 1a, 1b will scorch or foam. As a result, the welded joint has high mechanical strength. In addition, heater 2 is disposed partially at the joints only so that resin pipes 1a, 1b are softened and melted in limited area. While the resin pipes are welded together, the expanded air and resin is released through holes 2a so that bulges will rarely appear inside the joint between resin pipes 1a, 1b.

In the present invention, heater 2 has a plurality of holes in the cylindrical surface. These holes 2a are effective for releasing the expanded air and resin while the pipes are welded together. The holes also enable a worker to easily determine from the outflow of molten resin whether the outside part of the joint between resin pipes 1a, 1b has started to melt. As the outside part of the joint continues to be heated, the molten resin fills holes 2a. Therefore, heater 2 and resin pipes 1a, 1b are completely joined into one part. In other words, when the welding process is over, heater 2 reinforces the joint between resin pipes 1a, 1b. Stainless steel is especially suitable as a reinforcing material because it has high mechanical strength.

EXAMPLE 2

Figure 4:
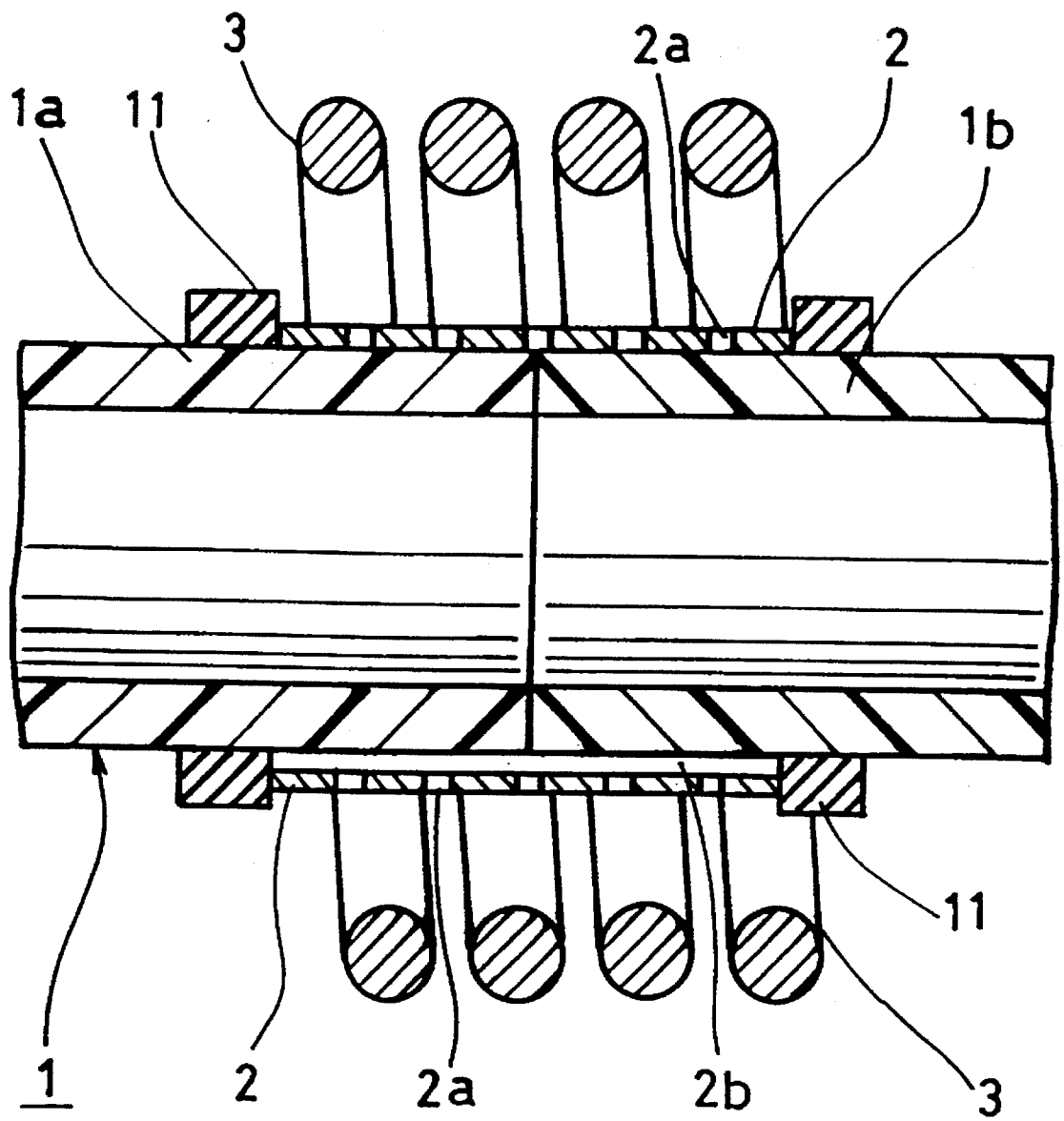
FIG. 4 is a cross-sectional view of the joint between two resin pipes which are in position to be connected in which a heater with holes is used and cylindrical stoppers are placed on both sides of the heater of a second embodiment.
Figure 5:
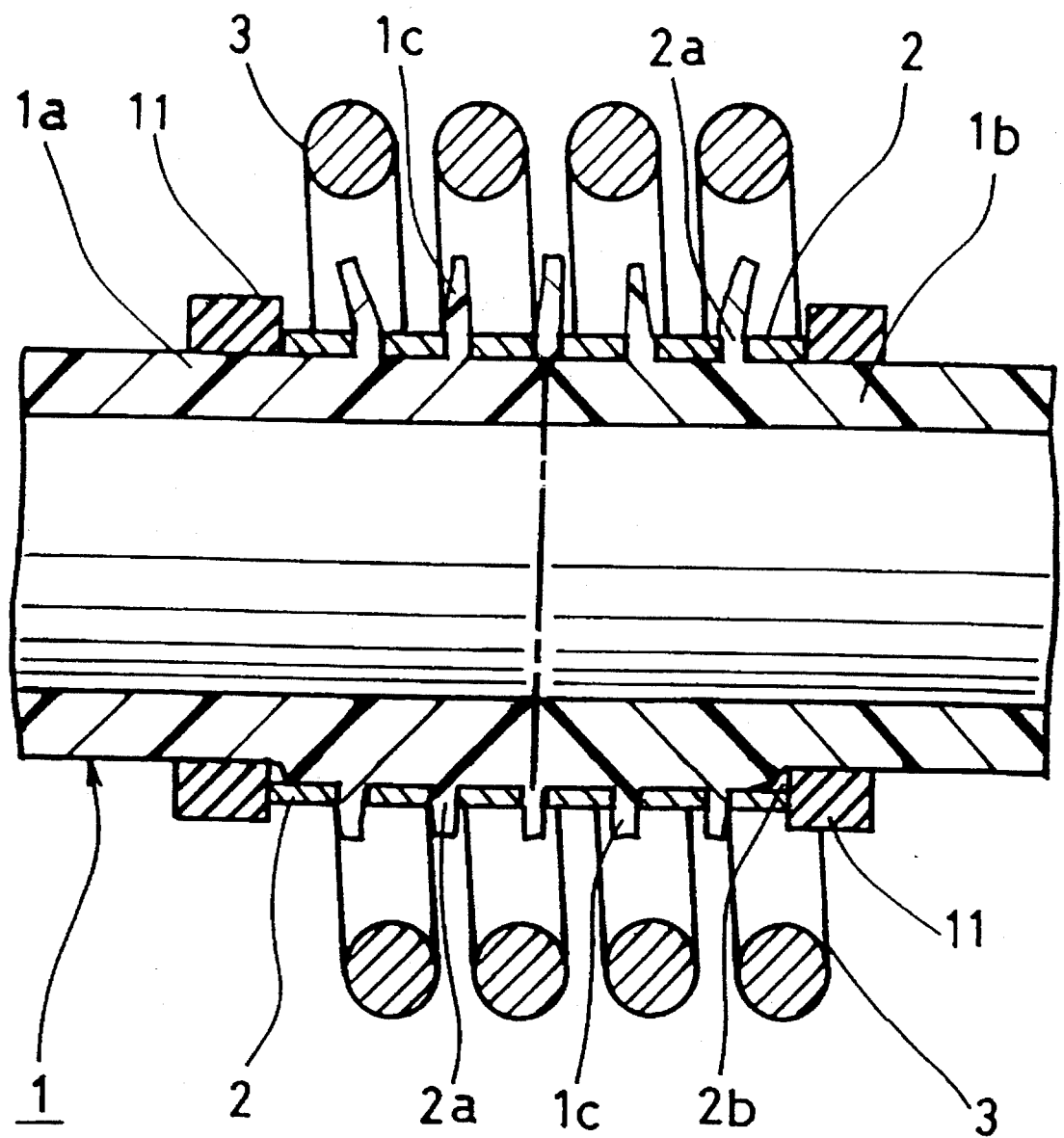
FIG. 5 is a cross-sectional view of the joint between two resin pipes immediately after being connected of a second embodiment.

A second embodiment of the method and the apparatus for connecting resin pipes of this invention is described with reference to FIG. 4 and FIG. 5. FIG. 4 is a cross-sectional view of the joint between two resin pipes to be connected. FIG. 5 is a cross-sectional view of the joint between two resin pipes immediately after being connected. Explanation about elements which have the same numbers as in FIGS. 2 and 3 has been omitted to avoid redundancy.

In the first embodiment, the inside part of heater 2 is placed in close vicinity to the outside part of resin pipes 1a, 1b. Heater 2 was molded by bending and welding the ends of a stainless steel plate into a cylindrical form. As a result, it is difficult to make the dimension of inside diameter of heater 2 almost equal to the outside diameter of resin pipes 1a, 1b. Similarly, it is difficult to maintain constant roundness. The inside diameter of heater 2 is usually calculated to be larger at a predetermined dimensional tolerance than the outside diameter of resin pipes 1a, 1b in order to mass-produce heaters. The second embodiment is intended to account for the case in which there is a gap between the inside part of heater 2 and the outside part of resin pipes 1a, 1b.

Actually, gravity causes gap 2b to form between the inside part of heater 2 and the outside part of resin pipes 1b, as shown in FIG. 4. (For explanatory purpose, gap 2b is drawn larger than its actual size.) If heater 2 is heated in this condition, as it would be in the first embodiment, the molten and expanded resin would not only flow out from holes 2a, but also from gap 2b which would result in resin bulges protruding from both sides of heater 2 (this is called a "bead"). When this occurs, it is possible that the joint is not only damaged at its surface, but also because the expanded air and molten resin are not released smoothly, the joint becomes rough inside. Therefore, cylindrical stoppers 11 comprising materials with heat-resisting and electrical insulating properties are placed on both sides of heater 2 to fill the gap between heater 2 and resin pipes 1a, 1b. The stoppers are effective for reducing the bead or the protruding part of the molten resin, for preventing the thickness of the molten part to decrease, for adjusting the internal pressure while melting, and for preventing the inside part of the joint from being rough. Materials which have heat-resisting and electrical insulating properties are thermosetting resins, such as phenolic resin, epoxy resin, unsaturated polyester resin, and diallyl phthalate resin, especially those which are reinforced with glass fiber. Furthermore, when these materials are used in tapes, they are more easily handled since the tape can be wound around the resin pipes easily to form cylindrical stoppers and the tape can be easily removed when the work is over.

The relationship between the nominal diameter of the resin pipes to be connected and the length of heater 2 will be explained. When heater 2 is long, a larger area around the joint between resin pipes 1a, 1b will be heated. When resin pipes 1a, 1b are heated, the pipes begin to expand even if the temperature has not reached the melting point. Accordingly, when a larger area is heated, internal pressure due to self inflation of resin will be higher. If internal pressure due to self expansion of resin becomes too high, resin pipes 1a, 1b start to melt from the outside until the remaining part becomes so thin that buckling occurs due to the internal pressure on the resin. Thus, rough parts appear inside the joint between resin pipes 1a, 1b. Therefore, it is necessary to determine the heating area or the length of heater 2 which is most suitable for the thickness of resin pipes 1a, 1b in order to reduce the rough surface due to buckling completely or to minimize it. Resin pipes with various nominal diameters were prepared to correspond to several kinds of heater 2 with different lengths. Each heater 2 was experimentally connected. The results are shown in Table 1 (below). The resin pipes were well connected without causing any bulges inside the joint.

(TABLE 1)

| nominal diameter | length of heater |
|---|---|
| 65 A | 20–30 mm |
| 75 A | 20–30 mm |
| 100 A | 30–45 mm |
| 125 A | 35–65 mm |

It is obvious from Table 1 that it is preferable that the length of heater 2 is between approximately ¼ and ⅔ of the nominal diameter of the resin pipes.

In the above-mentioned embodiments, the material used for resin pipes 1a, 1b was polyvinylidene fluoride (PVDF), but this invention is not limited to use with this resin. Any kind of thermoplastic resin pipes can be used. These kinds of resin pipe include, for example, fluorocarbon resins, such as polyvinylidene fluoride, tetrafluoroethylene-hexafluoropropylene copolymer (FEP), and tetrafluoroethylene-perfluoroalkylvinylether copolymer (PFA), as well as a wide range of thermoplastic resins, such as polyvinylchloride, polyethylene, polypropylene, polyphenylene sulfide, and polyetherether ketone. Furthermore, the shape of resin pipes is not restricted to straight pipes. Bent pipes, joint pipes, or pipes at the ends of valves are also included here. The fundamental principle of the present invention is not only applicable for connecting resin pipes, but also for connecting glass pipes (including quartz glass and silica glass).

In addition, the oscillating frequency of inverter 6 can be set flexibly within the range of at least 15~80 kHz so that it can handle different materials and diameters of resin pipes to be connected. It is also possible to record data in advance into memory, e.g., temperature data, data on heating time to softening and melting points of resin pipes for different materials and diameters, and input the data into a microcomputer which controls the electric current input into the work coil automatically. In this way, the connecting process in factories is simplified. A rather inexpensive litz wire which is a twisted thin wire is usually used as the material for work coil 3. When the connecting process of resin pipes is completed, work coil 3 will be cut off and removed from resin pipe line 1. Furthermore, when resin pipes 1a, 1b are welded together with pressure in the axial direction after the temperature at the joint has reached a predetermined softening or melting point, a predetermined jig can be used to obtain the best welding pressure.

EXAMPLE 3

Figure 6:
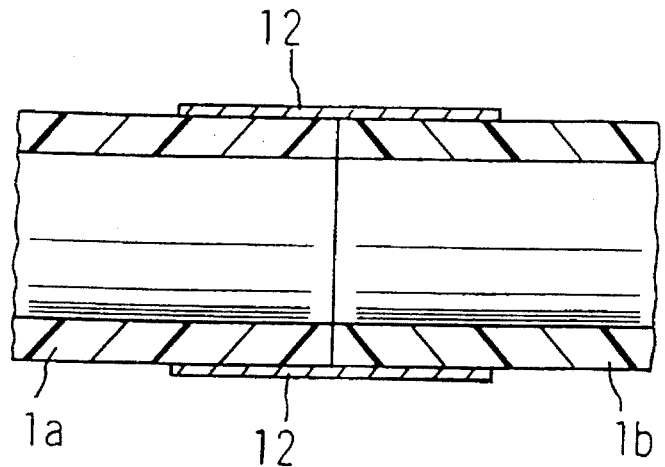
FIG. 6 is a cross-sectional view of the joint between two resin pipes to be connected in which a heater without holes is used of a second embodiment.
Figure 7:
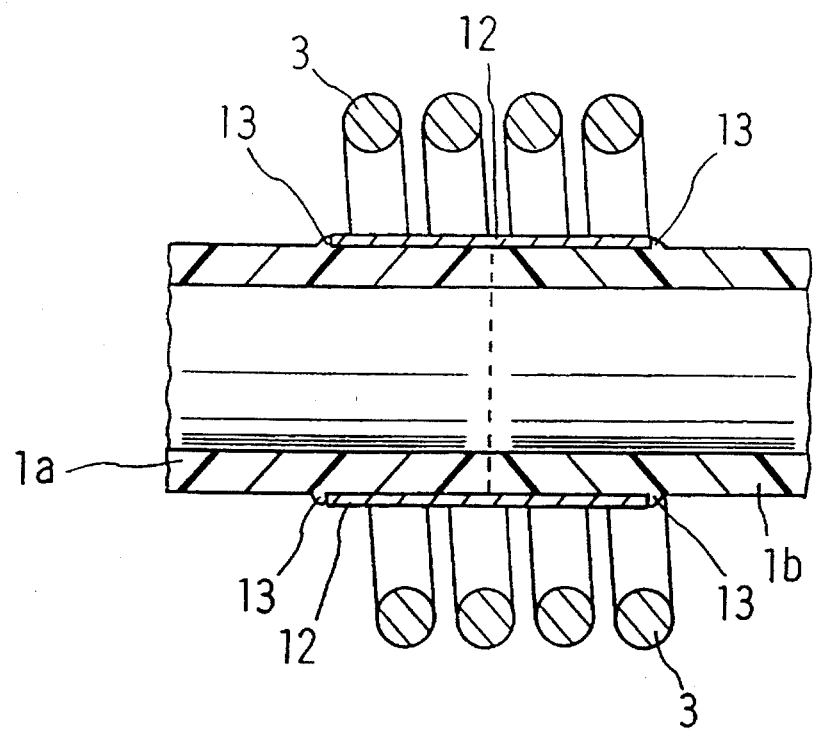
FIG. 7 is a cross-sectional view of the joint between two resin pipes immediately after being connected of a third embodiment.

A third embodiment of the method and the apparatus for connecting resin pipes of the present invention is described with reference to FIG. 6 and FIG. 7. FIGS. 6 and 7 are cross-sectional views of an embodiment for connecting two resin pipes by disposing a cylindrical metallic plate outside the pipes. The same high-frequency electric power generator was used as in FIG. 1.

Heater 12 is made of a cylindrical metal, such as aluminium, brass, or stainless steel. In this embodiment, there are no holes in the direction of the thickness on heater 12. When high-frequency electric power is input to work coil 3, it increases the temperature surrounding the joint between resin pipes 1a, 1b gradually. As soon as the temperature at the joint between resin pipes 1a, 1b reaches a predetermined softening or melting point, the resin pipes will be welded together. The molten resin expands in volume as it is heated so that the two resin pipes 1a, 1b are attached completely without a gap. Since the joint between resin pipes 1a, 1b is heated gradually, there is no danger for the joint between resin pipes 1a, 1b to scorch or to foam. As a result, the welded joint has high mechanical strength. In addition, heater 12 is only partially disposed at the joints so that the resin pipes are softened and melted in limited area. Accordingly, bulges rarely appear inside the joint between resin pipes 1a, 1b.

In addition, the oscillating frequency of inverter 6 can be set flexibly within the range of at least 15~80 kHz so that it can handle different materials and diameters of resin pipes to be connected. It is also possible to record data in advance into memory, e.g., temperature data, data on heating time to softening and melting points of resin pipes according to different materials and diameters, and input the data into a microcomputer which controls the electric current input into work coil automatically. In this way, the connecting process in factories is simplified. A rather inexpensive litz wire which is a twisted thin wire is usually used as a material for work coil 3. When the connecting process of resin pipes is completed, work coil 3 will be cut off and removed from resin pipe line 1. Furthermore, when resin pipes 1a, 1b are welded together with pressure in the axial direction after the temperature at the joint has reached predetermined softening or melting points, a predetermined jig can be used to obtain the best welding pressure.

This embodiment is explained with reference to FIGS. 6 and 7 using specific materials. The pipes 1a, 1b (outside diameter 76 mm, thickness 4.2 mm) were made of polyvinylidene fluoride (PVDF-65A, melting point: 178°~180° C.), and cylindrical metallic heater 12 (material: aluminium, inside diameter: 76.2 mm, thickness: 1.0 mm, length: 20 mm) was placed outside the pipes. Both end faces were matched exactly as shown in FIG. 6.

Then, work coil 3 comprising litz wire (material: copper, diameter of core wire: 0.12 mm, diameter of the whole wire: 6.6 mm) was loosely wound around (number of turns: 4 turns) as shown in FIG. 7. The welding process was completed in nine minutes by inputting 118 W electric power at frequency of 74 KHz.

Figure 8:
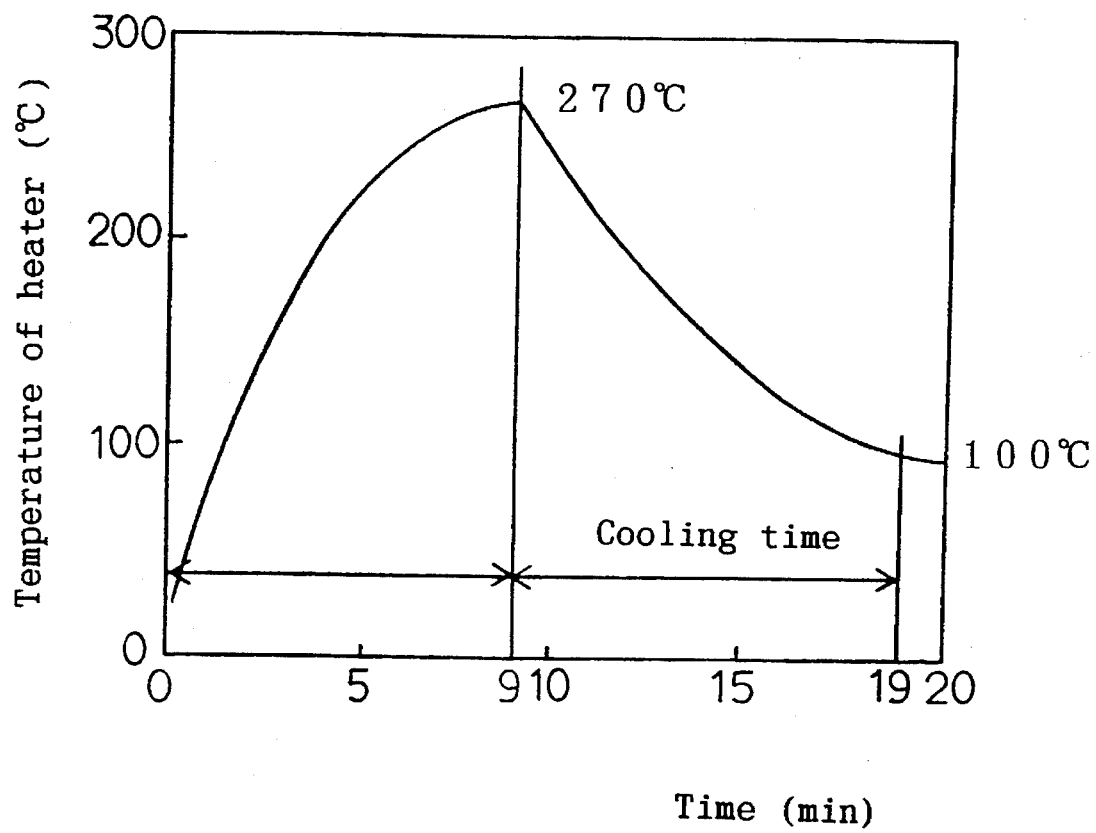
FIG. 8 is a graph showing the temperature change in the heater of a third embodiment.

In this embodiment, heater was heated up to 270° C. in nine minutes and cooled down to 100° C. in ten minutes after electric power was no longer provided. The change in temperature over time is shown in FIG. 8. As seen above, temperature control necessary for the welding process was conducted very easily. This welding process was started by inputting electric power into heater 12 which then emitted heat from its entire surface (sheet exothermic). A part of the resin next to heater 12 began to melt first. The volume of the molten resin increased, and a part of this molten resin formed build-up parts 13 on both sides of heater 12. A part of the molten resin moved into the gap at the ends of resin pipes 1a, 1b, thereby melting the resin at the boundary part. Since heat transfer is slow on the inside surface of resin pipes 1a, 1b, this portion starts to melt later. Pressure is produced to weld end faces at this time. It is preferable that this part also melts at the end. Actually, the inside surface remained as a wall (in a solid state) and did not change its shape drastically. Accordingly, it was confirmed in this pipe connecting method that the two resin pipes were welded together while providing bond pressure which is necessary to weld the end faces.

In the next phase, when the electric power supply stopped, 6r the amount of electric power supply was reduced gradually, heater 12 began to cool down, and the entire configuration became solid with build-up parts (bead) 13 of molten resin remaining at the ends of the heater. Accordingly, resin pipes 1a, 1b were welded together completely. The above-noted resin pipe was cut in two parts at the joint in the axial direction, and the cross-sectional view was checked. It was confirmed that the pipes are completely welded into one pipe.

The joint between resin pipes obtained by the above procedure did not have bulges on the inside by means of heater 12 even though hydraulic pressure was exerted on the pipes. The joint was also reinforced, especially in the bending direction. In addition, the molten part was finished smoothly and had no dead space.

EXAMPLE 4

Figure 9:
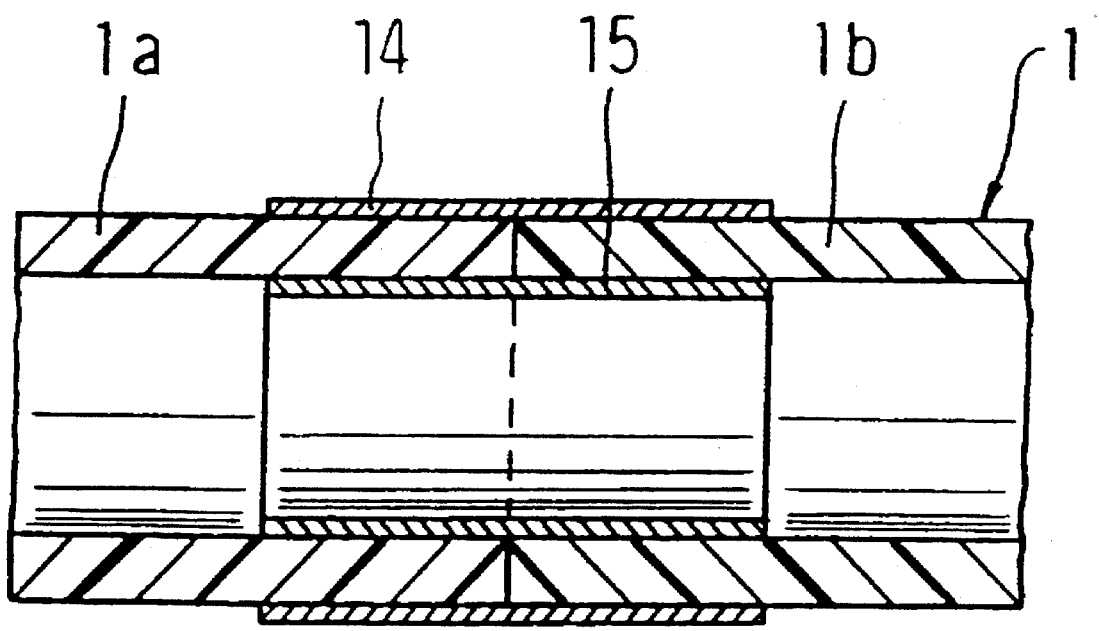
FIG. 9 is a cross-sectional view of heating elements without holes being placed on the inside and the outside of the resin pipes of a fourth embodiment.

In the third embodiment shown above (FIGS. 6 and 7), an example of a ring-shaped metallic heater 12 placed around the joint between resin pipes 1a, 1b was provided. It is also possible to form a joint as shown in FIG. 9. In the embodiment shown in FIG. 9, cylindrical metallic heaters 14, 15 were placed on the outside and inside faces of the joint between resin pipes 1a, 1b. It is preferable to place cylindrical metallic heaters 14, 15 on both faces of resin pipes for connecting thick pipes. At the same time, cylindrical metallic heater 15 is so thin that the inside surface will not be rough even if heater 14 is disposed inside and it hardly affects the flow of liquid in resin pipe lines.

EXAMPLE 5

Figure 10:
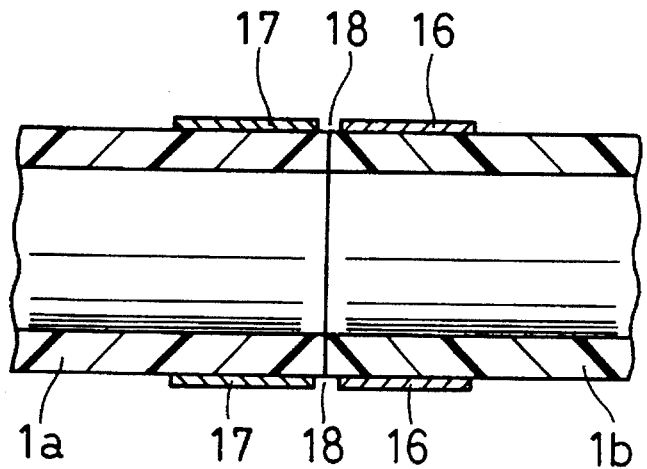
FIG. 10 is a cross-sectional view of the joint between two resin pipes which are in position to be connected in which two cylindrical heaters are disposed with space inbetween of a fifth embodiment.
Figure 11:
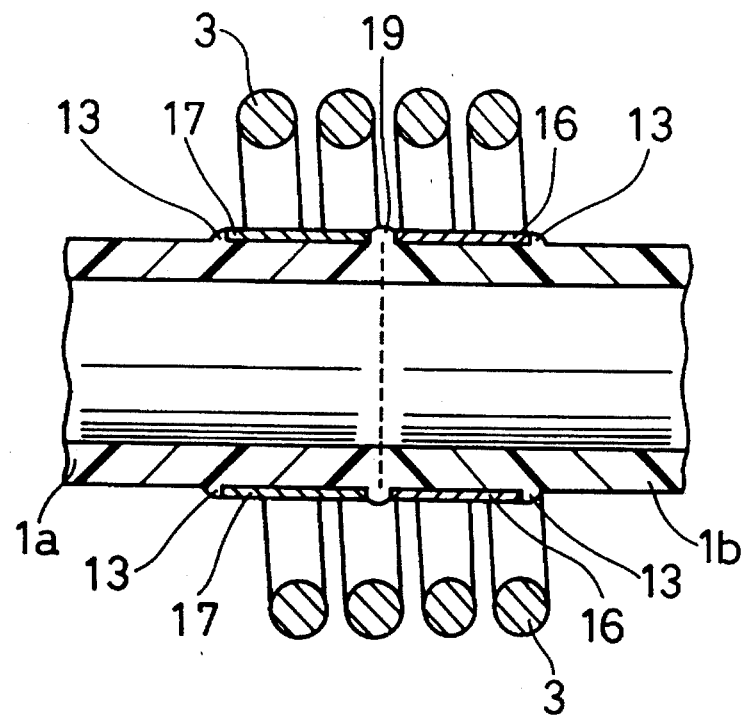
FIG. 11 is a cross-sectional view of the joint between two resin pipes immediately after being connected of a fifth embodiment.

In the third embodiment shown above (FIGS. 6 and 7), an example of a ring-shaped metallic heater 12 placed around the joint between resin pipes 1a, 1b was provided. In the embodiment shown in FIGS. 10 and 11, cylindrical metallic heaters 16 and 17 were disposed around each resin pipe in a state that about 2 mm space (slit) exists inbetween. In other words, a slit part 18 was made between the two cylindrical metallic heaters 16, 17. The pipes 1a, 1b (outside diameter 76 mm, thickness 4.2 mm) were made of polyvinylidene fluoride (PVDF-65A, melting point: 178°~180° C. ), and cylindrical metallic heaters 16, 17 (material: aluminium, inside diameter: 76.2 mm, thickness: 1.0 mm, length: 10 mm) were placed outside the pipes with both end faces matching exactly. The resin pipes connected according to the third embodiment showed that there was not air in the joint so that deformation of the resin pipes can be prevented. Moreover, the pipes could be connected with even more reliability since it was possible to weld and observe at the same time how the molted resin slowly flows into the slit part 18. The molted resin in the slit part 18 cooled in a build-up state and formed a build-up part 19.

We claim:

1. A method of connecting resin pipes, comprising the steps of:

(a) contacting two resin pipes positioned end to end to be connected to form an area of contact, (b) disposing a cylindrical metallic heater along the contact area between said resin pipes, wherein at least one material of said heater is selected from the group consisting of stainless steel, brass, and aluminum, and said heater has an axial length of from about ¼ to ⅔ of a nominal diameter of said resin pipes, (c) surrounding said heater with a coil, connecting a resonance capacitor and a secondary winding of an output transformer serially between both terminals of said coil, connecting a primary winding of another output transformer to an inverter which converts direct electric power from a power source into alternating electric power with a predetermined voltage and frequency, and connecting said inverter to said power source, wherein said heater is excited by high-frequency electric current heating said heater by induction heating and said joint between said resin pipes is welded together, (d) exciting said heater by high-frequency electric current, heating said heater by induction heating, wherein said contact between said resin pipes is welded together, and simultaneously said cylindrical metallic heater is fixed to the outer surface of said resin pipes.

2. A method of connecting resin pipes as claimed in claim 1, wherein said heater comprise a plurality of holes disposed in a cylindrical surface in the direction of thickness.

3. A method of connecting resin pipes as claimed in claim 2, wherein a diameter of each of said plurality of holes disposed in said cylindrical surface ranges from 0.1 mm to 5 mm.

4. A method of connecting resin pipes as claimed in claim 2, wherein said plurality of holes are disposed in several rows, and each of said holes in each of said rows are disposed at equal intervals.

5. A method of connecting resin pipes as claimed in claims 1 or 2, wherein an inside diameter of said heater has a dimensional tolerance larger than an outside diameter of said resin pipes, and said heater is heated in close vicinity to said resin pipes.

6. A method of connecting resin pipes as claimed in claim 1 or 2, wherein said heater has a cylindrical shape formed by welding ends of a plate together.

7. A method of connecting resin pipes as claimed in claim 4, wherein said plate is made of stainless steel.

8. A method of connecting resin pipes as claimed in claims 1 or 2, wherein cylindrical stoppers comprising a material with heat-resisting and electrical insulating properties are attached around said resin pipes on both sides of said heater.

9. A method of connecting resin pipes as claimed in claim 8, wherein a material for said cylindrical stoppers is from the group consisting of phenolic resin, epoxy resin, unsaturated polyester resin, and diallyl phthalate resin.

10. A method of connecting resin pipes as claimed in claim 1 or 2, wherein said cylindrical metallic heater is disposed around each resin pipe in a state that space exists resin pipes which ranges from 0.1 to 10 mm.

11. An apparatus for connecting resin pipes, said apparatus comprising:

a cylindrical metallic heater disposed around a contact area between two resin pipes to be connected end to end, wherein said heater comprises at least one material selected from the group consisting of stainless steel, brass, and aluminum, and said heater has an axial length of from about ¼ to ⅔ of a nominal diameter of said resin pipes, a coil surrounding said heater, and a resonance capacitor and a secondary winding of an output transformer which are connected serially between both terminals of said coil, a primary winding of another output transformer which is connected to an inverter converting direct electric power from a power source into alternating electric power with a predetermined voltage and frequency, wherein said inverter and said power source are connected to each other, a high-frequency electric current generator for exciting high-frequency electric current into said coil to heat said heater by induction heating, wherein said contact area between said resin pipes is welded together, and for simultaneously fixing said metallic heater to the outer surface of said resin pipes.

12. An apparatus for connecting resin pipes as claimed in claim 11, wherein said heater further comprises plurality of holes disposed in a cylindrical metal plate in a direction of thickness of said plate.

13. An apparatus for connecting resin pipes as claimed in claim 12, wherein said plurality of holes are disposed in several rows, and each of said holes in each of said rows are disposed at equal intervals.

14. An apparatus for connecting resin pipes as claimed in claim 12, wherein said plate is made of stainless steel.

15. An apparatus for connecting resin pipes as claimed in claims 13 or 14, wherein an inside diameter of said heater has a dimensional tolerance larger than an outside diameter of said resin pipes, and said heater is heated in close vicinity to said resin pipes.

16. An apparatus for connecting resin pipes as claimed in claim 13, wherein said heater has a cylindrical shape formed by welding ends of a plate together.

17. An apparatus for connecting resin pipes as claimed in claim 16, wherein a diameter of each of said plurality of holes disposed in said cylindrical surface ranges from 0.1 mm to 5 mm.

18. An apparatus for connecting resin pipes as claimed in claims 11 or 12, wherein cylindrical stoppers comprising a material with heat-resisting and electrical insulating properties are attached around said resin pipes on both sides of said heater.

19. An apparatus for connecting resin pipes as claimed in claim 18, wherein a material for said cylindrical stoppers is from the group consisting of phenolic resin, epoxy resin, unsaturated polyester resin, and diallyl phthalate resin.

20. An apparatus for connecting resin pipes as claimed in claim 11 or 12, wherein a cylindrical metallic heater is disposed around each resin pipe in a state that space exists between said resin pipes which ranges from 0.1 mm to 10 mm.

* * * * *